March 16, 1948. E. G. WOOLEY 2,438,086
SIDE FILE AND JOINTER FOR SPRING AND SWAGE TOOTH SAWS
Filed March 2, 1946  4 Sheets-Sheet 1

INVENTOR.
ERNEST G. WOOLEY
BY M. G. Charles
ATTORNEY.

March 16, 1948.                E. G. WOOLEY                 2,438,086
          SIDE FILE AND JOINTER FOR SPRING AND SWAGE TOOTH SAWS
              Filed March 2, 1946              4 Sheets-Sheet 2
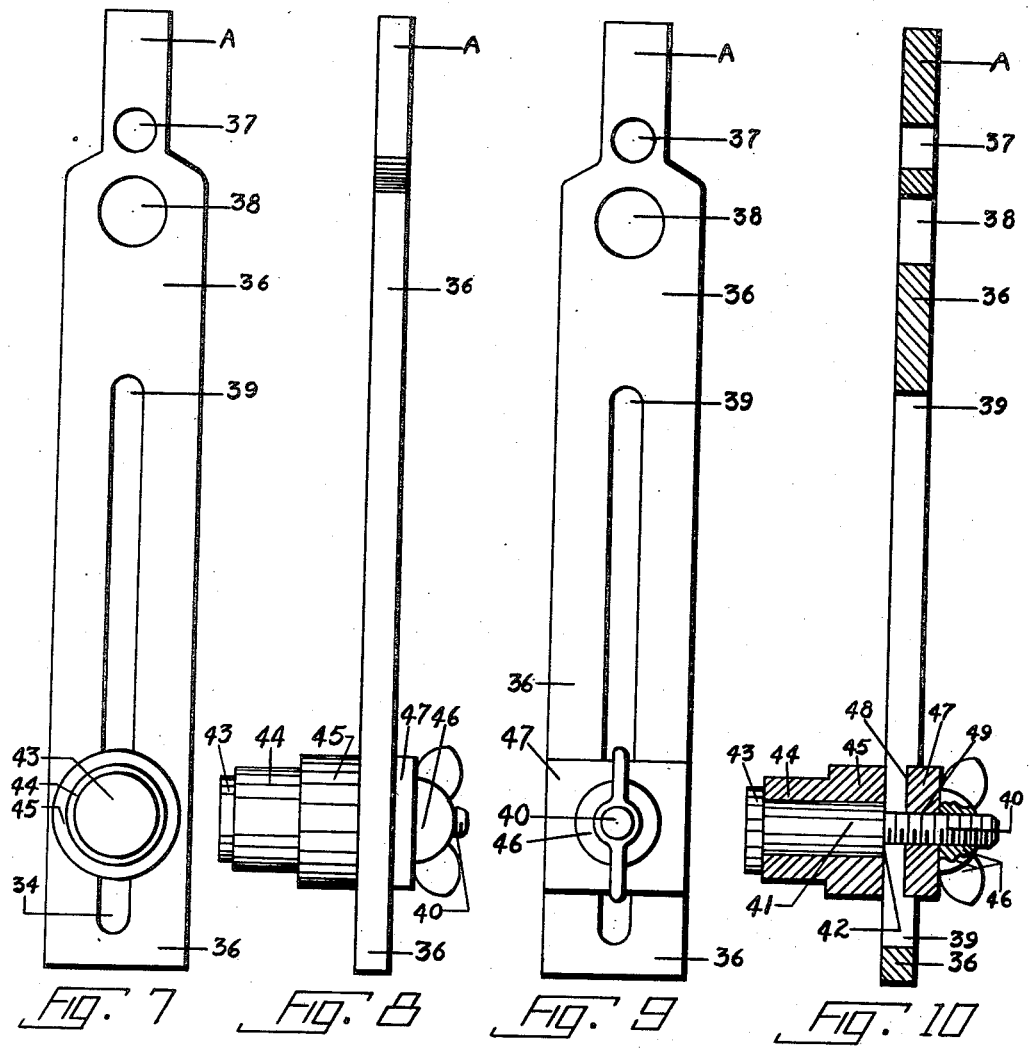
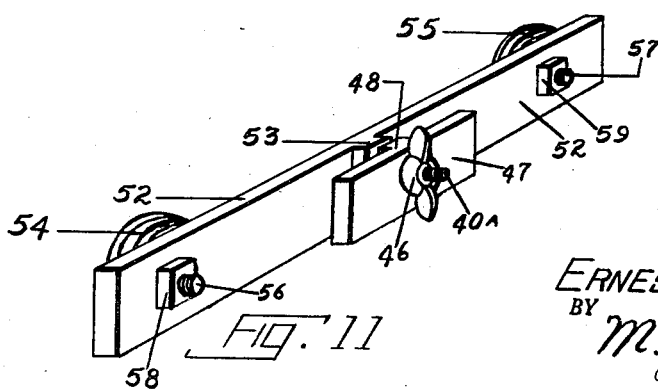
INVENTOR.
ERNEST G. WOOLEY
BY
M. Y. Charles
ATTORNEY.

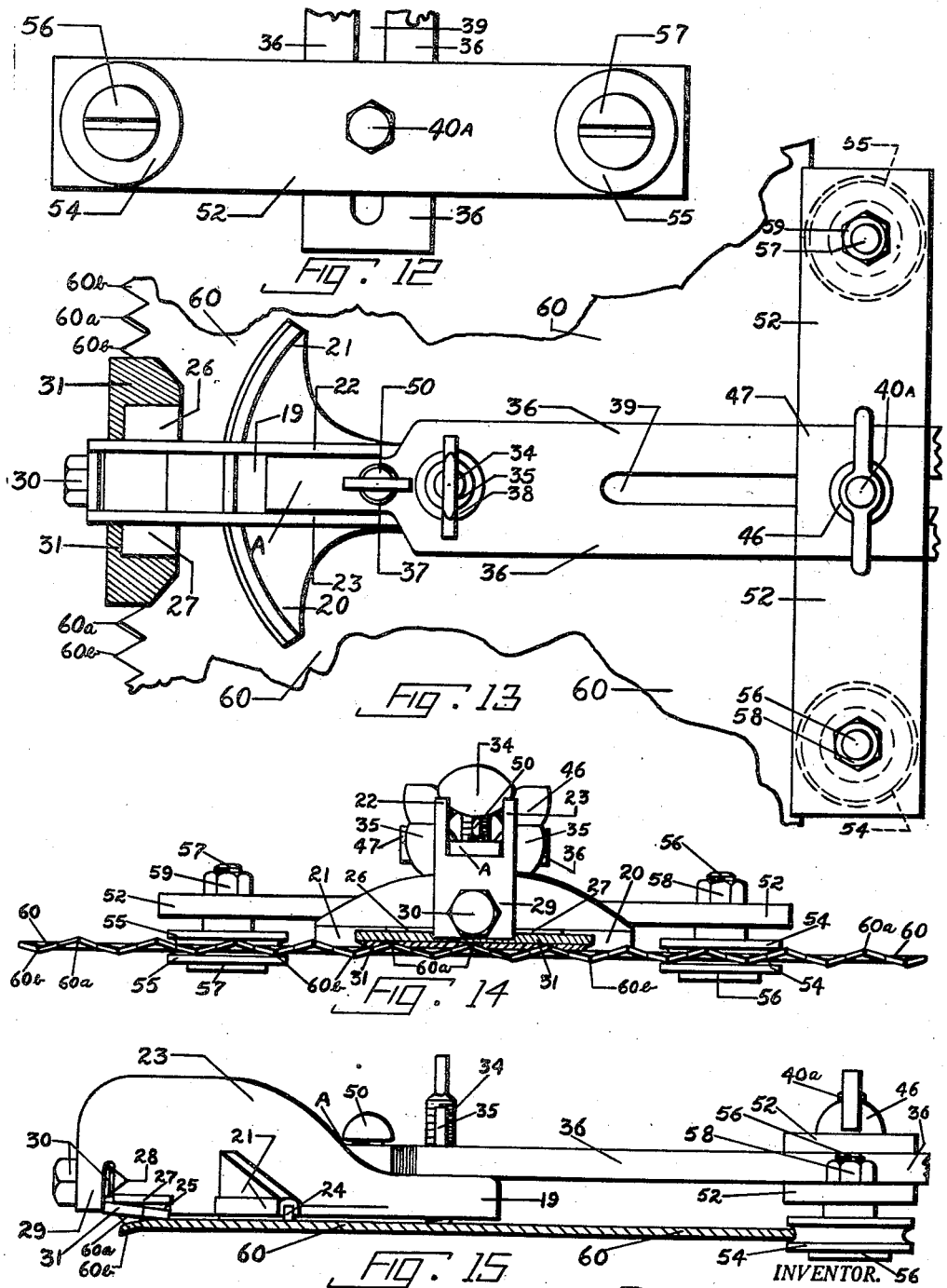

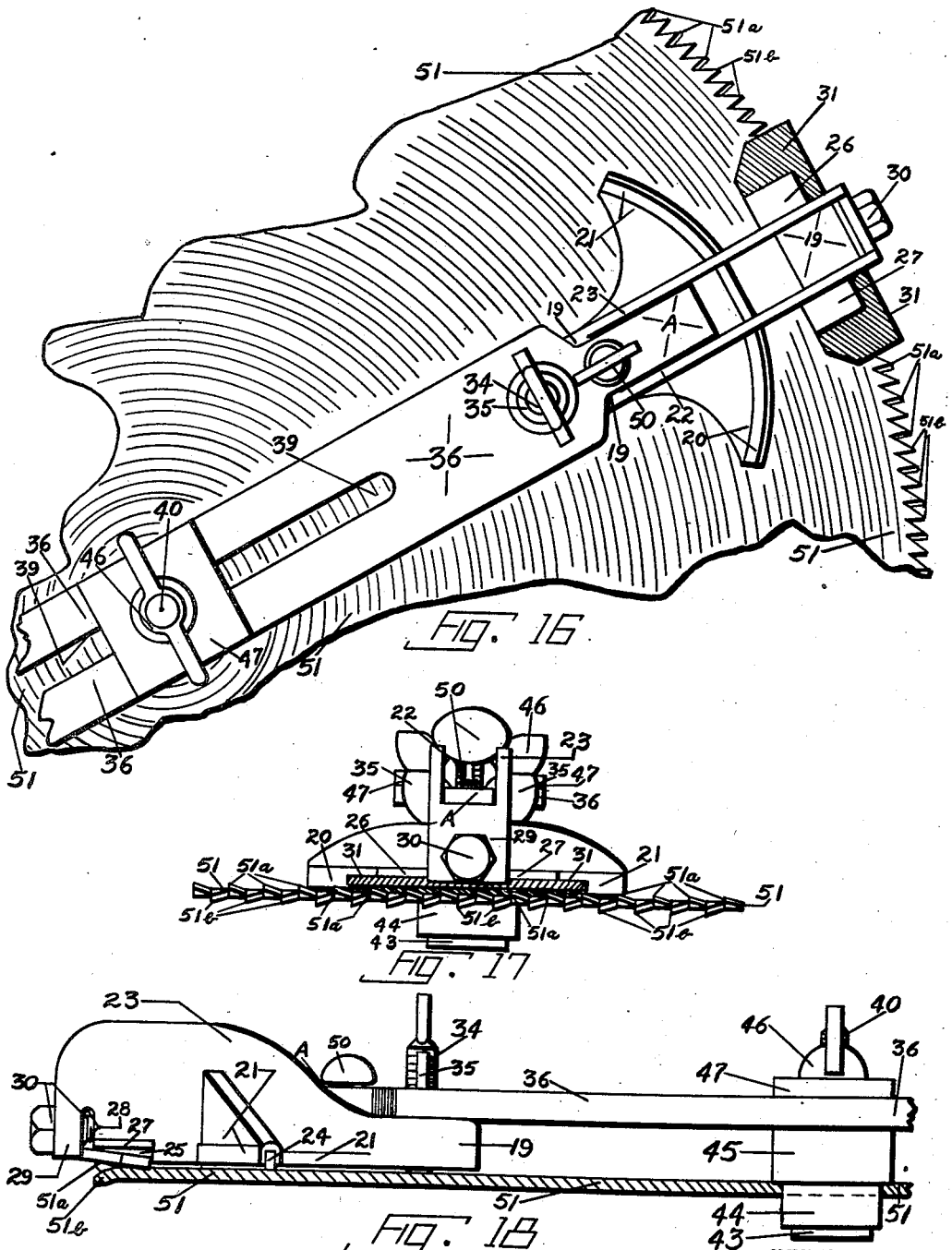

Patented Mar. 16, 1948

2,438,086

UNITED STATES PATENT OFFICE 2,438,086

SIDE FILE AND JOINTER FOR SPRING AND SWAGE TOOTH SAWS

Ernest G. Wooley, Wichita, Kans.

Application March 2, 1946, Serial No. 651,539

2 Claims. (Cl. 76—47)

My invention relates to an improvement in side files and jointers for spring and swage tooth saws. In saws of the spring tooth type, the teeth of the saw are set by pressing or bending one tooth to one side and the next tooth to the opposite side of the saw and so on the length or circumference of the saw. In so setting the saw teeth one tooth may bend easier than another and resulting in an irregular set, then, as the saw cuts, tooth marks are left on the face of the wood that has been cut and the cut surface of the wood is left rough and irregular. This roughness can be overcome if the points of all the saw teeth in each direction are set evenly so that all the tooth points are in exact alignment. In view of this, it is the object of my invention to provide a device which will cut the set teeth of a saw to exact alignment. A saw that has been filed, set, and the teeth aligned by my improved tool will make the saw run easier, smoother, and leave a surface on the wood that is entirely free of roughness and saw marks.

A further object is to provide a device of the kind mentioned that is applicable for use on all types of wood saws including the swage tooth type of saw.

Now referring to the accompanying drawings in which similar numerals of reference designate the same parts throughout the several figures of the drawings—

Fig. 7 is a detail bottom plan view of center attachment arm for adapting the tool to be used on a circular saw.

Fig. 8 is an edge view of the center attachment arm shown in Fig. 7.

Fig. 9 is a top plan view of the center attachment arm shown in Fig. 7.

Fig. 10 is a detail longitudinal sectional view through the center attachment arm shown in Fig. 7.

Fig. 11 is a detail perspective view of a cross arm for attachment to the center attachment arm, and is used to adapt the tool for use on band saws.

Fig. 12 is a detail bottom plan view of the cross arm shown in Fig. 11, the cross arm being mounted on the center attachment arm shown in Figures 7, 8, 9, and 10.

Fig. 13 is a top plan view of the tool adapted for use on a band saw.

Fig. 14 is a front end view of the tool as shown in Fig. 13 and showing the tool on a band saw in position for cutting the saw teeth to alignment.

Fig. 15 is a side view of the tool and saw as shown in Fig. 14 the saw being shown in section.

Fig. 16 is a top plan view of the tool adapted for use on a circular saw, and showing the tool in position on the saw for cutting the saw teeth to alignment.

Fig. 17 is a front end view of the tool and saw shown in Fig. 16.

Fig. 18 is a side view of the tool and saw shown in Fig. 16, the saw being shown in section.

Figure 1:
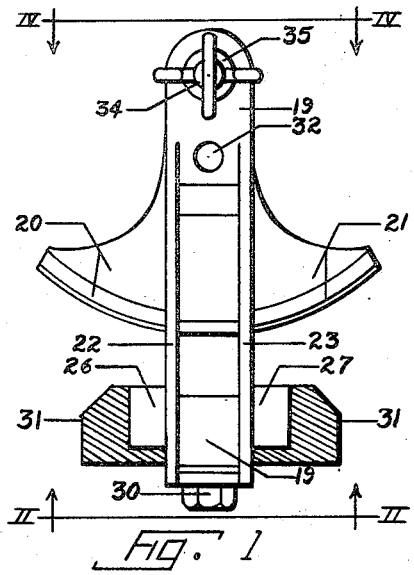
Fig. 1 is a plan view of the back side of the tool.
Figure 4:
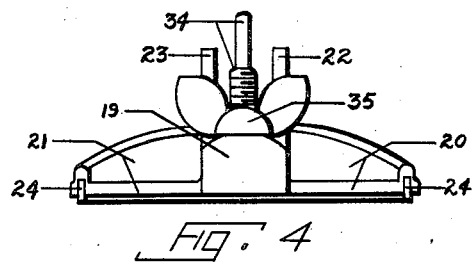
Fig. 4 is an end view of the tool as seen from the line IV—IV in Fig. 1 and looking in the direction of the arrows.
Figure 2:
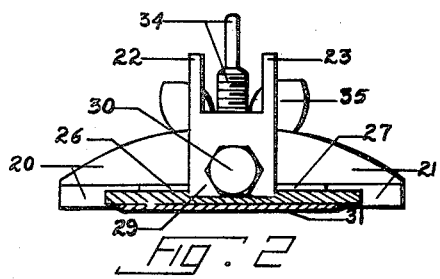
Fig. 2 is an end view of the tool as seen from the line II—II in Fig. 1 and looking in the direction of the arrows.
Figure 5:
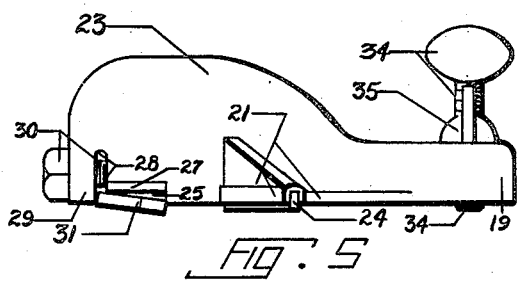
Fig. 5 is a side view of the tool.
Figure 3:
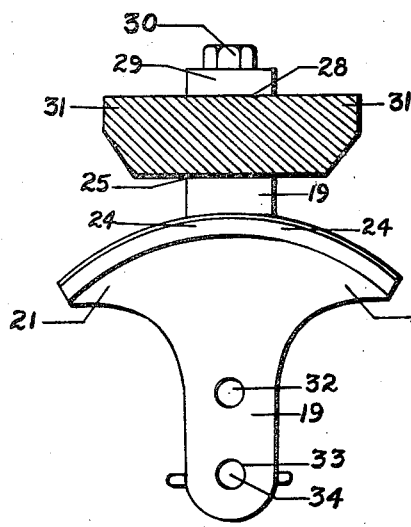
Fig. 3 is a face elevational view of the tool.
Figure 6:
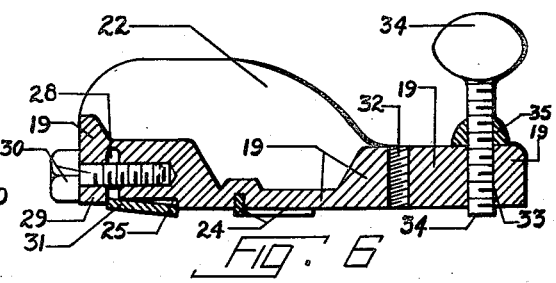
Fig. 6 is a detail longitudinal sectional view through the tool.

In the drawings the device is shown as having a body element 19 the central portion of which is provided with arcuate lateral extensions 20 and 21 that are integrally formed thereon and the bottom faces of which are flush with the bottom of the body element 19. The upper side of the body element 19 is provided with a pair of upwardly extending ear-like elements 22 and 23, that are parallelly positioned and spaced apart, and their outside faces are flush with the opposite side faces of the body element 19, and the ear-like elements 22 and 23 are integrally formed on the body element 19.

A curved insert 24 is embedded in the body element 19 and arcuate side extensions 20 and 21, and one edge of the curved insert 24 projects from and beyond the bottom face of the body element 19 and arcuate extensions 20 and 21. The curved insert 24 is preferably made of steel or hard fiber and acts as a gauge bearing as will later be explained.

The front end of the bottom side of the body element 19 is provided with a transversely positioned groove 25, and laterally extending support plates 26 and 27 that are integrally formed on the body element 19, and the bottom faces of the laterally extending support plates are flush with the bottom of the groove 25 in the body element 19. At the front side of the groove 25 there is a cut 28 extending upwardly into the body element 19 and forming a lip-like element 29 that forms the front face of the groove 25. A cap screw 30 is slidably passed through the lip 29 and threaded into the body element 19.

A flat file element 31 fits closely in the groove 25 and rests against the file support extensions 26 and 27. The file 31 may be rigidly held in the groove 25 by screwing the screw 30 into the body element 19 whereupon the head of the screw 30 will engage and press the lip 29 against the edge of the file 31 to rigidly bind and hold the file 31 in the groove 25 as shown. Before tightening the file in the groove 25 the file may be tilted slightly to any desired angle to suit the user of the tool as shown and for purposes that will later be described.

The rear end portion of the body element 19 is provided with a pair of threaded holes 32 and 33 therethrough for purposes that will later be described.

In the hole 33 is threaded a thumb screw 34 on which is threaded a winged lock nut 35 to lock the adjusting screw 34 in adjusted positions for purposes that will later be described.

The tool as thus far described may be used on hand saws, and may be made ready for use, and may be used as follows.

The saw may be filed and set by pressing and bending each successive tooth in opposite directions in the usual manner. In so setting a saw the teeth may not bend uniformly and the points of some of the teeth may project sideways more than others, therefore the saw will not cut evenly and smooth and will be harder to push, therefore it is desirable to even up or align all the points of the teeth of the saw, and this may be done by using my improved tool as follows:

The file 31 may be set in a tilted position in the groove 25 to substantially match the angle of the set saw teeth. This having been done, the tool may be laid on the side of the saw with the file resting on or being positioned over the saw teeth. This having been done the adjusting screw 34 may be screwed up or down so the lower end of the screw 34 will engage the saw blade and raise or lower the rear end of the body element 19 to rock the tool until the file 31 engages the saw teeth to the desired degree whereupon the winged lock nut may be tightened on the thumb screw 34 to lock the thumb screw 34 in its adjusted position. Now the tool may be moved back and forth the length of the saw blade whereupon the file will cut the saw tooth points to a point where the gauge insert element 24 will engage and slide on the side of the saw blade; the same process is repeated on the other side of the saw, whereupon the points of the saw teeth are all cut to alignment and the saw is now ready for use.

The tool may be similarly prepared for use on circular saws, although a better job may be obtained if the tool were moved in a uniform circular line of travel. To accomplish this movement, the tool is provided with a center holding extension arm 36 that has a narrowed end portion A that is designed to fit snugly between the ear-like elements 22 and 23 of the body element 19, and the extension arm 36 lies on top of the rear portion of the body element 19. The arm 36 is provided with a pair of holes 37 and 38 that will register with the holes 32 and 33 in the body element 19. The hole 38 is larger than the hole 33 for reasons that will later be made obvious. The arm 36 is also provided with a longitudinally positioned slot 39.

Slidably positioned in the slot 39 is a pin 40 that is integrally formed on the end of a larger roller pin 41 thereby forming a shoulder 42 which slidably rests against the under side of the arm 36; the outer end of the roller pin 41 is provided with a head 43 that is integrally formed thereon. Revolvably mounted on the roller pin 41 is a roller 44 having an outwardly extending flange portion 45 integrally formed thereon that is revolvably positioned against the under side of the arm 36, and the roller 44—45 is retained on the roller pin 41 by the pin head 43. The outer end of the pin 40 is threaded to receive a threaded wing nut 46.

A slide block 47 having a tongue 48 integrally formed thereon is positioned on the upper side of the arm 36 with the tongue 48 snugly and slidably fitted in the slot 39 of the arm 36. The pin 40 slidably passes through a hole 49 in the slide block 47—48 so that the wing 46 may be screwed on the pin 40 to pull the pin shoulder 42 against the bottom side of the arm 36 and press the slide plate 47 against the upper side of the arm 36 to rigidly bind and hold the roller pin 41 in adjusted positions along the arm 36.

The arm 36 is attached to the body element 19 by placing the arm extension A between the ear-like elements 22 and 23 and then passing a thumb screw 50 through the loosely fitting hole 37 in the extension arms 36 and then screwing the screw 50 into the threaded hole 32 in the body element 19, and the wing nut 35 will be loosely housed in the hole 38 in the extension arm 36.

Now to apply the tool to a circular saw 51, the wing nut is loosened on the pin 40, and the roller 44 placed in the arbor hole in the center of the saw with the flange 45 resting against the side of the saw. Now the tool 19 and arm 36 may be moved longitudinally until the points 51a of the saw teeth will be engaged by the central longitudinal portion of the file 31. This adjustment having been made, the wing nut 46 is tightened on the pin 40 whereby the roller pin 41 is rigidly locked on the extension arm 36 at the proper place to maintain the file 31 in its radial adjusted position. This adjustment having been made, the angular adjustment of the position of the file 31 relative to the angle of the set of the saw teeth may be made precisely the same as previously described in the fore part of this specification, and the tool is ready for use. Now by moving the tool in the circular motion as will be governed by the extension arm 36 and pin 41 and roller 44, the file 31 will engage and cut the points 51a of the saw teeth until the curved gauge element 24 engages the side of the saw, and the end of the screw 34 already engaging the side of the saw, the file 31 will no longer cut the teeth points 51a as the file 31 is moved thereover, therefore all the points 51a of the saw teeth are in perfect alignment. Now the saw may be turned over and the tool similarly applied to the row and the oppositely set teeth may also be accurately aligned whereupon the saw is then ready for use.

Now to connect the tool for use on band saws: A cross bar 52 having a transversely positioned tongue 53 integrally formed thereon is substituted for the aforementioned roller pin 40—41, and the tongue 53 is snugly and slidably positioned in the slot 39 in the extension arm 36, and a bolt 40a is slidably passed through holes in the slide block 47—48 and the cross bar 52—53, and through the slot in the extension bar 36. The wing nut 46 is threaded on the bolt 40a and engages the slide block 47 to pull the slide block 47 and cross bar 52 toward each other to rigidly clamp and hold the cross bar 52 at adjusted positions along the extension arm 36, and the tongue 53 serves to maintain the cross bar 52 at an angle of ninety degrees to the extension arm 36 at all times. Grooved rollers 54 and 55 are revolvably carried on the under side of the cross-bar 52 and on headed pins 56 and 57 that are carried one on either end of the cross-bar 52 and pass therethrough, and nuts 58 and 59 are threaded on the upper ends of the pins 56 and 57 and bear against the upper side of the cross bar 52 to rigidly bind and hold the pins 56 and 57 in place in the ends of the cross bar 52. This conversion of the tool is used by placing the smooth back edge of the band saw 60 in the grooves of the rollers 54 and 55, and loosening the wing nut 46 on the bolt 40a whereupon the extension arm 36 and tool body 19 may be moved longitudinally until central longitudinal portion of the file 31 rests against the tooth points 60a of the band saw 60, and the rollers 54 and 55 serve to maintain the file 31 in its proper longitudinal position relative to the saw tooth points 60a. Now the tool may be moved along the length of the saw whereupon the file 31 will cut the saw tooth points 60a to alignment whereupon the wing nut 46 may be tightened for locking purpose. This having been done, the tool may be turned over and similarly applied to the other side of the saw to similarly cut the saw tooth points 60b to alignment the same as the tooth points 60a.

In the tool as shown in Figures 13, 14, 15, 16, 17, and 18, the end A of the extension arm 36 fits snugly between the ear-like elements 22 and 23, therefore the body element 19 will remain in alignment with the extension arm 36 but the thumb screw 50 being loose in the hole 37 will permit the body element 19 to rock so that the lower end of the screw 34 will always rest on the saw body 51 or 60 and as the file 31 cuts the saw tooth points the curved gauge element 24 will also engage the saw body 51 or 60 and a uniform job of cutting and aligning the saw tooth points will be done on both sides of the saw.

While the foregoing specification and description have had reference to the spring type tooth of saws, it is to be noted that swage tooth saw teeth bear the same characteristics so far as the tooth points projecting on opposite sides of the saw blade is concerned, therefore the foregoing described tool will work equally as well on the swage tooth type saw as it will on the spring tooth type of saw.

Such modifications of my invention may be employed as lie within the scope of the appended claims without departing from the spirit and intention of the invention. Now having fully shown and described my invention, what I claim is:

1. In a side file and jointer tool for saws; a body element and a saw tooth cutting element, said body element having a transverse recess in one end thereof for the reception of the said cutting element and means for forcibly narrowing the said recess for rigidly holding the cutting element therein, a gauge element, said gauge element being carried by the said body element and projecting therefrom intermediately the ends of the body element, the other end of said body element having a support therein, said support being adjustable to predetermine the ultimate angle of the body element relative to the saw blade and teeth thereof for the purpose described, said body element having projecting elements thereon that are parallelly positioned and spaced apart as finger holds for moving the tool for saw tooth point cutting purposes, an extension arm for said tool, means for attaching said extension arm to the said body element and means on said extension arm for engaging said finger hold elements of the body element to hold the body element in alignment with the said extension arm, a cross bar, said cross bar being stationable on and along the extension arm, and means for maintaining the cross bar at right angles to the extension arm, and means on the extension arm for engaging the back edge of the band saw for the purpose described, said means for engaging the back edge of a band saw being a pair of grooved rollers, said rollers being revolvable, carried one on each end of said cross bar.

2. In a side file and jointer tool for saws; the structure defined in claim 1, said extension arm being removable from the balance of the structure to leave the said balance of the structure as an unguided hand tool for use as described.

ERNEST G. WOOLEY.

REFERENCES CITED

The following references are of record in the file of this patent:

UNITED STATES PATENTS

| Number | Name | Date |
| --- | --- | --- |
| 257,831 | Poindexter | May 9, 1882 |
| 334,730 | Schoch | Jan. 19, 1886 |
| 473,622 | Ferguson | Apr. 26, 1892 |
| 504,726 | Hatfield | Sept. 12, 1893 |
| 763,085 | Arnott | June 21, 1904 |
| 890,727 | Todd | June 16, 1908 |
| 1,242,726 | Robbins | Oct. 9, 1917 |
| 1,836,120 | Huther | Dec. 15, 1931 |

FOREIGN PATENTS

| Number | Country | Date |
| --- | --- | --- |
| 88,528 | Sweden | Feb. 16, 1937 |